United States Patent
Karamanolis et al.

(10) Patent No.: US 10,102,057 B2
(45) Date of Patent: Oct. 16, 2018

(54) PROVIDING END-TO-END CHECKSUM WITHIN A DISTRIBUTED VIRTUAL STORAGE AREA NETWORK MODULE

(71) Applicant: VMware, Inc., Palo Alto, CA (US)

(72) Inventors: Christos Karamanolis, Los Gatos, CA (US); Wenguang Wang, Santa Clara, CA (US); Kiran Joshi, San Jose, CA (US); Sandeep Rangaswamy, Mountain View, CA (US)

(73) Assignee: VMware, Inc., Palo Alto, CA (US)

( * ) Notice: Subject to any disclaimer, the term of this patent is extended or adjusted under 35 U.S.C. 154(b) by 41 days.

(21) Appl. No.: 14/716,756

(22) Filed: May 19, 2015

(65) Prior Publication Data

US 2016/0342462 A1    Nov. 24, 2016

(51) Int. Cl.
*G06F 11/10* (2006.01)
*H04L 29/08* (2006.01)
*G06F 3/06* (2006.01)
*H04L 29/06* (2006.01)

(52) U.S. Cl.
CPC .......... *G06F 11/1004* (2013.01); *G06F 3/064* (2013.01); *G06F 3/067* (2013.01); *G06F 3/0619* (2013.01); *G06F 3/0664* (2013.01); *H04L 67/1097* (2013.01); *H04L 67/38* (2013.01)

(58) Field of Classification Search
CPC .... G06F 11/1004; G06F 3/064; G06F 3/0619; G06F 3/0664; G06F 3/067; H04L 67/1097
See application file for complete search history.

(56) References Cited

U.S. PATENT DOCUMENTS

| 5,778,395 | A | 7/1998 | Whiting et al. |
| 6,289,023 | B1 * | 9/2001 | Dowling .............. H04L 1/0057 370/419 |
| 9,058,230 | B1 * | 6/2015 | van Rietschote ......... G06F 8/61 |
| 2007/0038913 | A1 * | 2/2007 | Allen ................. G11B 20/1813 714/758 |
| 2015/0058291 | A1 * | 2/2015 | Earl .................. G06F 17/30144 707/625 |

OTHER PUBLICATIONS

Zooko Wilcox-O'Hearn, Hack Tahoe-LAFS!, Drew Perttula and Attacks on Convergent Encryption, Mar. 20, 2008, downloaded on Apr. 24, 2015 at: https://tahoe-lafs.org/hacktahoelafs/drew_perttula. html, 4 pages.

* cited by examiner

*Primary Examiner* — April Ying Shan Blair
*Assistant Examiner* — Rong Tang
(74) *Attorney, Agent, or Firm* — Fish & Richardson P.C.

(57) ABSTRACT

Exemplary methods, apparatuses, and systems include a first layer of a virtual storage area network (VSAN) module receiving a write request from a data compute node. The write request includes data to be written and the VSAN module is distributed across a plurality of computers to provide an aggregate object store using storage attached to each of the plurality of computers. The first layer of the VSAN module calculates a checksum for the data to be written and passes the data to be written and the checksum to a second layer of the VSAN module. The second layer of the VSAN module calculates a first verification checksum for the data to be written. The data and the checksum are written to persistent storage in response to determining the first verification checksum matches the checksum passed by the first layer of the VSAN module.

14 Claims, 9 Drawing Sheets

PROVIDING END-TO-END CHECKSUM WITHIN A DISTRIBUTED VIRTUAL STORAGE AREA NETWORK MODULE

FIELD OF THE INVENTION

The various embodiments described in this document relate to storing and utilizing metadata to maintain and verify the integrity of data within a virtual storage area network.

BACKGROUND OF THE INVENTION

Storage systems, such as a virtual storage area network (VSAN), provide servers with a centralized collection of storage devices. Features such as snapshots, redundant arrays, checksums, encryption, and data deduplication are desirable for enterprise storage systems. Such features, especially when combined, complicate the implementation of the storage systems.

For example, snapshots of a virtual disk or other portion of storage (e.g., a logical volume) may be created as (virtual) sparse disks. Sparse disks use a copy-on-write mechanism, in which the snapshot is an ordered set of blocks (or other logical address space) and contains no data in portions of a stripe until copied there by a write operation. In other words, the snapshot only contains data that differs from the previous snapshot and conserves resources by avoiding the copying of data that has not changed from the previous snapshot. The portion of snapshots that contain no data are referred to as "holes." When reading data from a snapshot that includes a hole, data represented by the hole is read from a parent snapshot or the base disk. When snapshots are created as sparse disks, however, a data value (such as a "0") may not be distinguished from a hole when calculating parity for, e.g., a redundant array of independent disks (RAID). As a result, snapshots with holes may not be rebuilt from parity and, therefore, are incompatible with RAID.

Additionally, it is desirable to detect data errors introduced by storage or transmission of the data. The use of a checksum algorithm is one means of detecting such errors. The implementation of end-to-end checksums on top of storage systems, however, can significantly slow the processing of input/output (I/O) operations.

Data deduplication and encryption are also desirable features in enterprise storage. Deduplicating encrypted data requires using the same key to encrypt the same data. This may be accomplished by generating data-specific encryption keys such that the same data (e.g., clear text) will be encrypted into the same encrypted data (e.g., cipher text). As a result, matching encrypted data may be deduplicated. The storage and management of data-specific encryption keys, however, complicates the implementation of the storage system. For example, an efficient method of storing and verifying the multitude of encryption keys is needed to ensure that data can be correctly decrypted and repaired when needed.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

Figure 1:
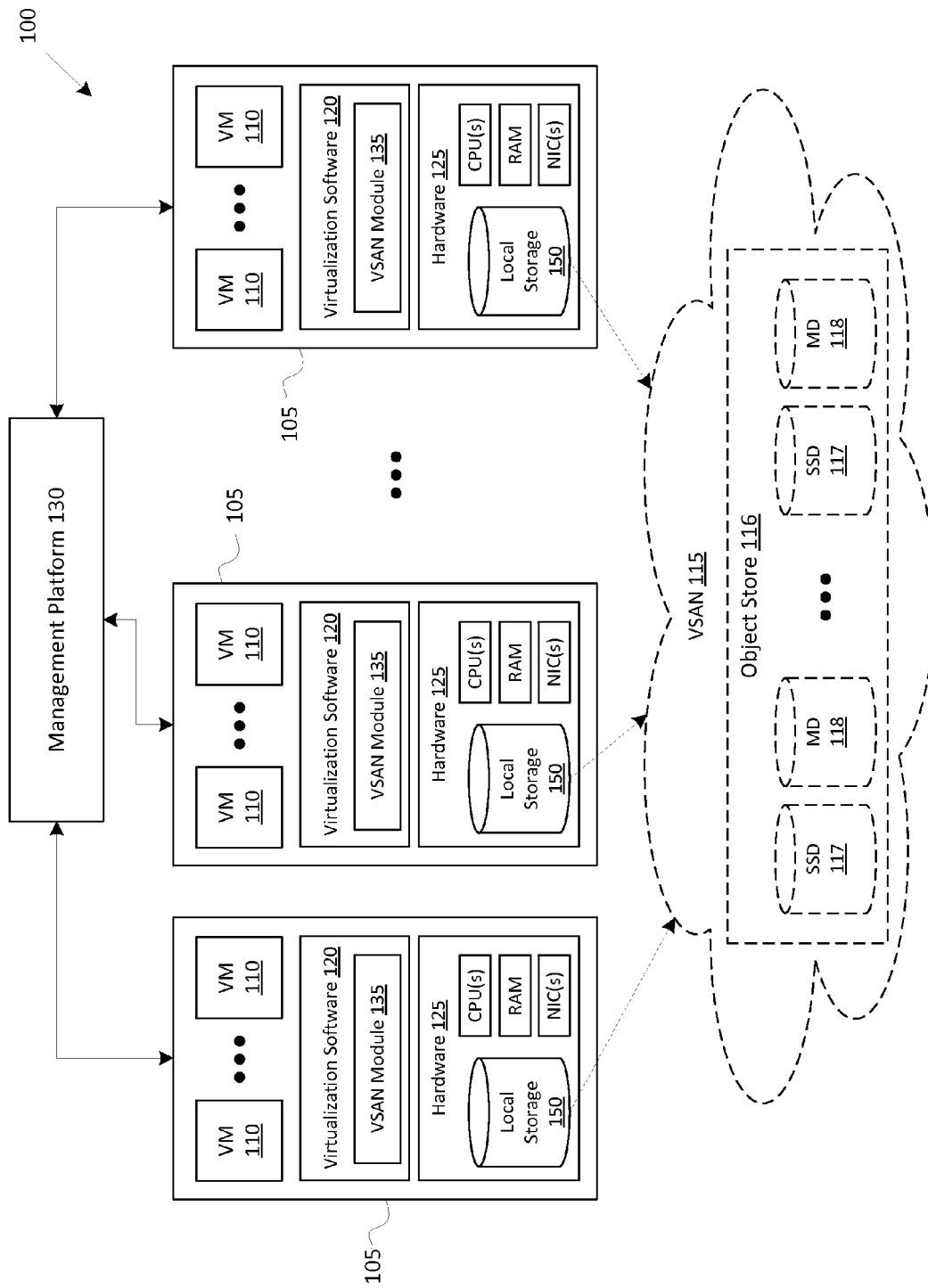
FIG. 1 illustrates, in block diagram form, an exemplary virtual datacenter environment including one or more networked processing devices maintaining hole boundary information, providing end-to-end checksum within a distributed virtual storage area network layer, and providing encryption on top of data deduplication.

This document describes embodiments that maintain hole boundary information for snapshots by calculating a block attribute parity value. In particular, embodiments calculate the block attribute parity value using block attributes within a stripe. A block attribute is a value that indicates whether the block includes written data or is a hole. For example, embodiments receive a request to write to a first block of a stripe of data stored across different physical storage devices. The block attribute of the first block indicates the first block includes written data based upon the received request. A block attribute of a second block in the stripe is determined and the block attribute parity value is calculated based upon both the block attribute of the first block and the block attribute of the second block. In one embodiment, the block attribute parity value is calculated by applying an exclusive or (XOR) to the first and second block attributes. The block attribute parity value and the data parity value are stored on one of the physical storage devices in response to the received write request. As a result, if a disk is lost, both data and holes can be recovered using, respectively, the data parity values and the block attribute parity values.

This document further describes embodiments that provide end-to-end checksum within a distributed virtual storage area network (VSAN). For example, a VSAN module is distributed across a plurality of computers to provide an aggregate object store using storage attached to each of the plurality of computers. A first layer of the VSAN module may receive a write request from a virtual machine (VM), physical machine, container, or directly from an application. For simplicity of describing embodiments set forth in this description, reference will be made to a VM. The write request includes data to be written. The first layer of the VSAN module calculates a checksum for the data to be written and passes the data and checksum to a second layer of the VSAN module. The second layer calculates a verification checksum for the data. In one embodiment, the second layer calculates the verification checksum in response to determining that first layer passed the checksum from a different computer. The data and the checksum are written to persistent storage in response to determining the verification checksum matches the checksum passed by the first layer of the VSAN module. Similar checksum verification can be applied when the data and checksum are read from storage. As a result, a VSAN module layer that provides an input/output (I/O) interface for a VM can run on a different server than a VSAN module layer that manages a storage object (or a portion thereof) while still providing end-to-end checksum verification.

This document further describes embodiments that store and verify encryption keys that enable deduplication of encrypted data. For example, embodiments generate and wrap a convergent encryption key that is stored within a block of wrapped convergent encryption keys. In one embodiment the encryption keys are wrapped in a datacenter tenant-specific secret. In one embodiment, a combination of one or more of block attributes, block attribute parity values, checksum values for data, and/or wrapped encryption keys are stored in each block. A checksum for the block is calculated and used to verify the integrity of one or more encryption keys for subsequent encryption or decryption. If the checksum verification fails, a reserved checksum value is set for the block until the block can be repaired from a minor copy. As a result, a large number of encryption keys can be reliably stored and maintained in order to enable deduplication of encrypted data.

FIG. 1 illustrates, in block diagram form, exemplary computing environment 100, including one or more networked nodes 105 to maintain hole boundary information, provide end-to-end checksum within a distributed virtual storage area network layer, and/or maintain encryption keys that enable deduplication of encrypted data. Nodes 105 may also be referred to within this document as computers and/or servers. In one embodiment, server-based computing in computing environment 100 provides centrally-managed user virtual desktops, such as those implemented by virtual machines (VMs) 110, via one or more networks (e.g., a local area network or other private or publically accessible wide area network, such as the Internet). For example, a client device and a VM 110 use a desktop remoting protocol such as Remote Desktop Protocol (RDP), Virtual Network Computing (VNC), or Personal Computer over Internet Protocol (PCoIP) to remotely access/provide remote access to a virtual desktop generated by the VM 110. In one embodiment, one or more VMs 110 implement a virtualized compute, networking, storage, or security service (e.g., a firewall, webserver, database server, etc.). In one embodiment, computing environment 100 provides segregated server-based computing environments for multiple datacenter tenants. A datacenter tenant refers to a group of users that share common access with specific privileges. For example, the group of users may have common access to stored data objects, applications, etc. that users of another tenant may not access.

Hardware 125 includes one or more processors ("CPU(s)"), data storage and memory (e.g., "RAM"), and network interface controllers ("NIC(s)"). The data storage and memory may be used for storing data, metadata, and programs for execution by the processor(s). The data storage and memory may include one or more of volatile and non-volatile memories, such as Random Access Memory ("RAM"), Read Only Memory ("ROM"), a solid state disk ("SSD"), Flash, Phase Change Memory ("PCM"), or other types of data storage, such as magnetic disk drives, optical disk drives, etc. The memory may be internal or distributed memory.

One or more buses may be used to interconnect the various components of hardware 125. Additionally, the network interface controllers may be used to connect nodes 105, via a wired or wireless network, with one another.

Virtualization software layer 120 runs on hardware 125 of host server or node (e.g., a physical computer) 105. Virtualization software layer 120 manages VMs 110 and physical resources, such as hardware 125. Additionally, virtualization software layer 120 maintains virtual-to-physical hardware mappings. For example, virtualization software 120 may manage VM access to a processor, memory, or a network interface within hardware 125. Additionally, virtualization software 120 may manage access to virtual disks (or portions thereof) and other related files within storage 150 that may be accessed by VMs 110 residing in one or more nodes 105.

Management platform 130 is associated with nodes 105. Management platform 130 enables an administrator to manage the configuration of computing environment 100. In one embodiment, management platform 130 provides a management console for manual and automated control of nodes 105, VMs 110, and hardware 125. For example, management platform 130 may provision, configure, and maintain VMs 110 as virtual desktops or network services, manage pools of computer resources to run VMs 110, etc. In one embodiment, an administrator sets and/or defines storage policies using management platform 130.

As shown, computing environment 100 includes software-based "virtual storage area network" (VSAN) 115 that leverages local storage 150 housed in or directly attached to host servers or nodes 105 (as used in this document, the term "housed" or "housed in" may be used to encompass both housed in or otherwise directly attached storage). VSAN 115 provides an aggregate block object store 116 to VMs 110 running on nodes 105. For example, each individual block (e.g., a 4KB portion of storage) may be individually updated as a storage entry. Local storage 150 housed in or otherwise directly attached to the nodes 105 may include combinations of solid state drives (SSDs) 117 and/or magnetic or spinning disks (MDs) 118. In certain embodiments, SSDs 117 serve as a read cache and/or write buffer in front of magnetic disks 118 to increase I/O performance.

Each node 105 includes storage management or VSAN module 135 to automate storage management workflows (e.g., create objects in block object store 116, etc.) and provide access to objects in block object store 116 (e.g., handle I/O operations to objects in block object store 116, etc.) based on predefined storage policies specified for block objects in block object store 116. For example, because a VM 110 may be initially configured by an administrator via management platform 130 to have specific storage requirements for its "virtual disk" depending upon its intended use (e.g., capacity, availability, TOPS, etc.), the administrator may define a storage profile or policy for one or more VMs 110 specifying such availability, capacity, TOPS, and the like. VSAN module 135 may then create a "block object" for the specified virtual disk by backing it with physical storage resources of block object store 116 based on the defined policy.

In one embodiment, VSAN module 135 provides access to VSAN 115 through which an administrator can create a number of top-level "device" or namespace objects that are backed by block object store 116. In one common scenario, during creation of a device object, the administrator may specify a particular file system for the device object (such device objects hereinafter also thus referred to "file system objects" or "storage objects"). A file system object may, itself, provide access to a number of virtual disk descriptor files accessible by VMs 110. These virtual disk descriptor files contain references to virtual disk "objects" that contain the actual data for the virtual disk and are separately backed by object store 116. A virtual disk object may be a hierarchical or "composite" object that is further composed of "component" objects (again separately backed by object store 116) that reflect the storage requirements (e.g., capacity, availability, IOPs, etc.) of a corresponding storage profile or policy generated by the administrator when initially creating the virtual disk. For example, a component may be a stripe, a block or other portion of a stripe, or another partition of storage that makes up a portion of a file system object.

Each VSAN module 135 (e.g., through an object management layer or submodule) communicates with other VSAN modules 135 of other nodes 105 to create and maintain an in-memory metadata database (e.g., maintained separately but in synchronized fashion in the memory of each node 105) that contains metadata describing the locations, configurations, policies, and relationships among the various objects stored in object store 116. This in-memory metadata database is utilized by a VSAN module 135 on a node 105, for example, when an administrator first creates a virtual disk for a VM 110 as well as when the VM 110 is running and performing I/O operations (e.g., read or write) on the virtual disk. VSAN module 135 traverses a hierarchy of objects using the metadata in the in-memory database in order to properly route an I/O operation request to the node (or nodes) 105 that houses (house) the actual physical local storage that backs the portion of the virtual disk that is subject to the I/O operation. VSAN module 135 is described in further detail with reference to FIG. 6.

Maintaining Hole Boundary Information

In one embodiment, VSAN 115 is configured as a redundant array of independent disks (RAID). In a RAID configuration, data for a VM 110 may be stored in stripes. In one embodiment, data of each object (e.g., a virtual disk object) is striped across multiple component objects. In one embodiment, stripe data is stored across multiple physical storage devices 150 of multiple nodes 105. Additionally, parity data may be stored in another physical storage device 150. As a simple example of a stripe, data may be stored across two storage devices 150 and parity values may be stored in a third storage device 150. If the value of data stored in the first storage device 150 were a "1" and the value of data stored in the second storage device 150 were a "0" and parity is calculated by applying XOR to the data values, a parity value of "1" (the result of 0 XOR 1) would be stored in the third storage device 150. As a result, a stripe of "1 0 1" would be stored across the three storage devices 150.

In one embodiment, storage 150 or VSAN 115 is configured to create snapshots (which may also be referred to as delta disk files) over time. The snapshot represents the difference between the current state of the virtual disk and the state that existed at the time that the previous snapshot was taken. When a snapshot is created, the state of the virtual disk is preserved by preventing the guest operating system of a VM 110 from writing to the preserved state. In one embodiment, a snapshot has two files: a small descriptor file that contains information about the virtual disk, such as child-parent snapshot relationship information, and a corresponding file that contains the raw data.

In one embodiment, snapshots are created as sparse disks. Sparse disks use a copy-on-write mechanism, in which the snapshot contains no data in portions of a stripe until copied there by a write operation. In other words, the snapshot only contains data that differs from the previous snapshot and conserves resources by avoiding the copying of data that has not changed from the previous snapshot. The portion of snapshots that contain no data are referred to as "holes." When reading data from a snapshot that includes holes, a node 105 reads data represented by the holes from a parent snapshot or the base disk. The creation of snapshots as sparse disks is described further with reference to FIG. 2.

In an embodiment in which snapshots are created as sparse disks, however, a data value may not be distinguished from a hole when calculating parity. For example, in calculating parity, a hole may be treated like a zero. As a result, in a simple three storage device example of a stripe, a hole may be treated like a data value of "0" for the purpose of parity. If a value of stripe data stored in another storage device 150 were a "1," parity would be calculated and result in the value of "1" (the result of 0 XOR 1). As a result, a stripe of a hole would result in the same parity value as a stripe of a data value of "0." In the instance of a failed, disconnected, or otherwise lost storage device 150 having the hole, the use of the parity value to recover lost data would result in writing a data value of "0" in the portion of the stripe that was a hole, regardless of the data value that would be read in a parent or base disk as a result of the hole.

In order to distinguish a hole from a data value in calculating parity, an embodiment calculates block attribute parity. For example, a block attribute value distinguishes between holes and written data values and a parity value calculated using block attributes (block attribute parity) enables an embodiment to determine whether a hole or a data value should be recovered. Block attributes and block attribute parity are described further with reference to FIGS. 3 and 4.

Figure 2:
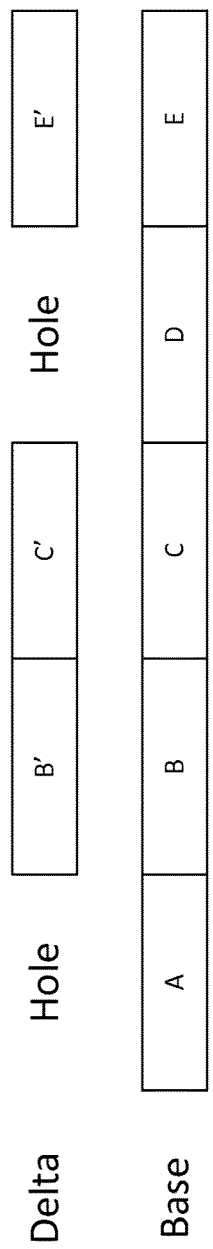
FIG. 2 illustrates an exemplary snapshot of a base disk.

FIG. 2 illustrates an exemplary portion of a striped snapshot (or delta disk) and a corresponding portion of a striped base disk. Each portion of the striped snapshot and base disk include a series of blocks which is collectively referred to as a "stripe." The illustrated stripe of the base disk includes five blocks: A, B, C, D, and E. Upon or following the creation of the snapshot, write commands to modify the stripe are stored as blocks B', C', and E'. As a result, original blocks B, C, and E are preserved in the base disk. Additionally, unmodified blocks A and D are not copied to the snapshot copy of the stripe. Instead, these blocks are represented as holes in the snapshot copy of the stripe. A read of the current state of the stripe would return block A from the base disk, due to the first hole in the snapshot copy, blocks B' and C' from the snapshot copy, block D from the base disk, due to the second hole in the snapshot copy, and block E' from the snapshot copy. In an embodiment implementing RAID, one of blocks B, C, and E may be a parity block.

Figure 3:
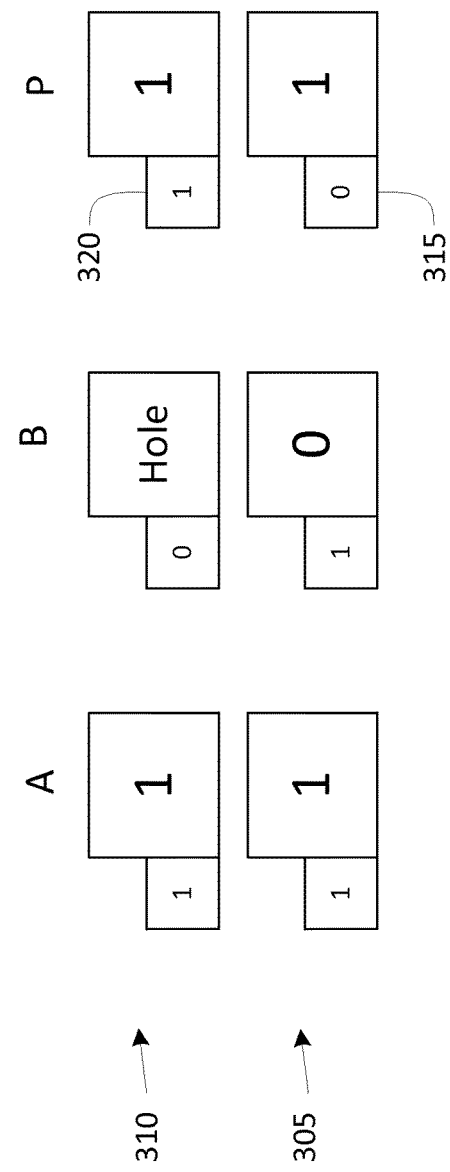
FIG. 3 illustrates exemplary block attributes and block parity attributes for maintaining hole boundary information for restoring snapshots from parity.

FIG. 3 illustrates exemplary stripes 305 and 310 along with block attributes and block parity attributes for maintaining hole boundary information for restoring snapshots from parity. As represented by the larger squares, stripe 305 includes a data value of "1" within disk/storage A, a data value of "0" within disk/storage B, and a corresponding parity value of "1" stored within disk/storage P. Stripe 310 includes a data value of "1" within storage A, a hole within storage B, and, following the examples from above that treat a hole as a "0" for calculating a data parity value, a corresponding parity value of "1" stored within storage P. If storage B were to fail or otherwise be lost, a simple parity recovery operation would find the result of an XOR of the data value from storage A ("1") and the parity value ("1") to be a recovery value of "0" for both stripes 305 and 310. As a result, the hole within stripe 310 would be lost in recovery. To avoid this, a block parity attribute is calculated and stored in addition to each data parity value. A block attribute for each block is determined based upon whether the block includes written data or is a hole. For example, the blocks within storage A for each of stripe 305 and stripe 310 includes a written data value of "1" and, as a result, is determined to have a corresponding block attribute of "1" (as illustrated by the smaller square to the left of the data value). The block within storage B for stripe 305 includes a written data value of "0" and, as a result, is also determined to have a block attribute of "1." In contrast, the block within storage B for stripe 310 is a hole and, as a result, is determined to have a block attribute of "0." While this example uses a block attribute value of "0" to represent a hole and a block attribute value of "1" to represent written data, the opposite binary values or other values may be used.

In one embodiment, block attributes are determined by requesting written extents or other portions of storage. For example, a block mapping table or other data structure may provide an indication of blocks having written data and the lack of such an indication may be interpreted as a hole. In another embodiment, block attributes are stored and maintained in a separate data structure. For example, a block attribute may be set to "1" when a block is written. In such an embodiment, the determination of block attributes may include reading the block attribute values from the separate data structure.

In one embodiment, block parity attributes are calculated in a similar fashion to calculating data parity values. For example, block parity attribute 315 for stripe 305 may be the result of an XOR operation applied to the block attributes within stripe 305 (1 XOR 1=0). Similarly, block parity attribute 320 for stripe 310 may be the result of an XOR operation applied to the block attributes within stripe 310 (1 XOR 0=1). Once calculated, the block parity attributes are stored to enable recovery of hole boundaries within stripes. For example, storage B were to fail or otherwise be lost, a calculation similar to a data parity recovery operation can be performed to determine if a hole or a data value was lost. Continuing the example of using an XOR operation, the XOR of block parity attribute 315 ("0") and the block attribute of stripe 305 within storage A ("1") would result in a block attribute of "1" for stripe 305 within storage B. Given that, in this example, a block attribute of "1" indicates a written data value, data parity recovery may be performed to recover the lost data value. In contrast, the XOR of block parity attribute 320 ("1") and the block attribute of stripe 310 within storage A ("1") would result in a block attribute of "0" for the block portion of stripe 310. A block attribute of "0" indicates a hole and data parity recovery is not needed for this block.

Figure 4:
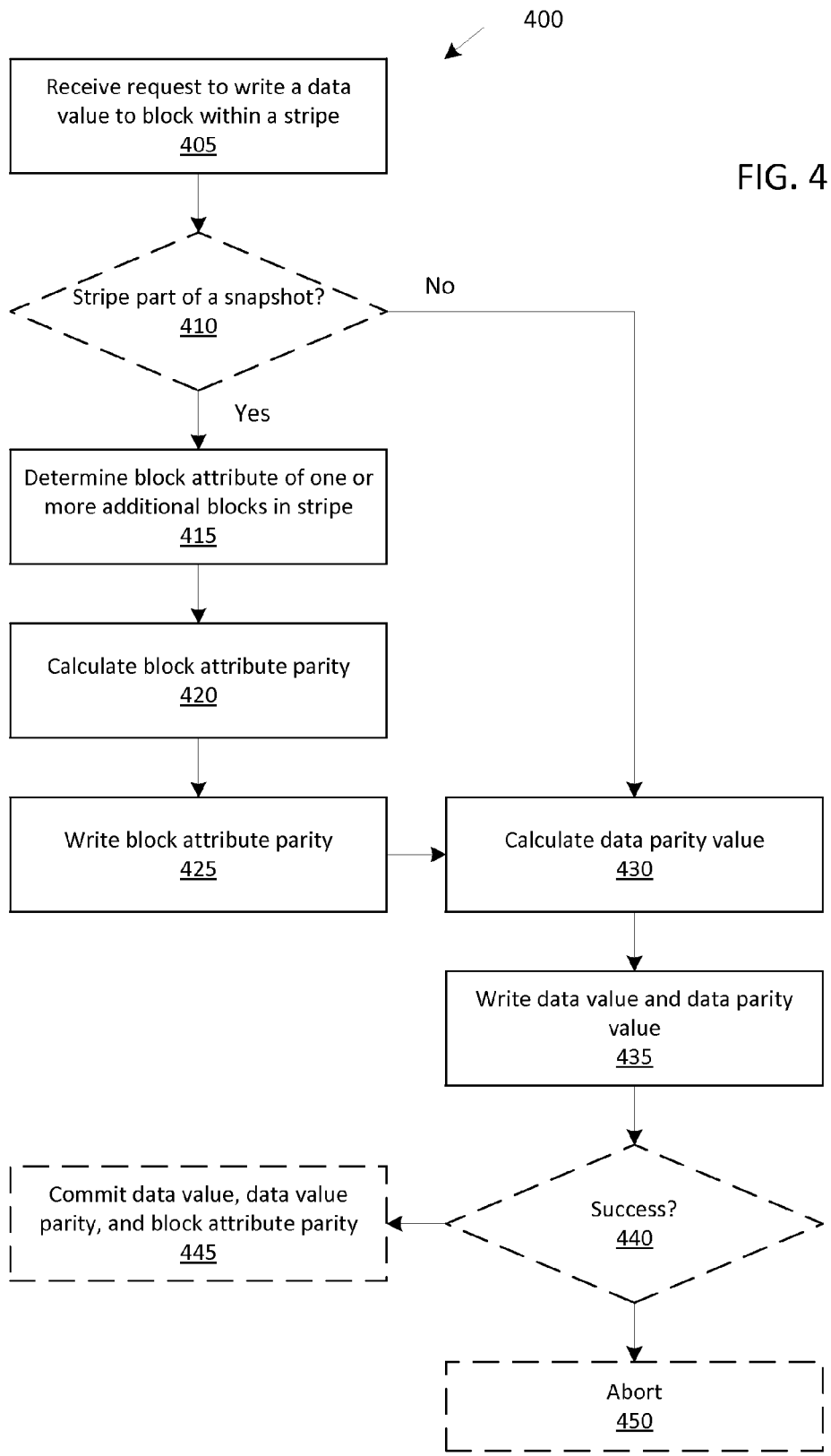
FIG. 4 is a flow chart illustrating an exemplary method of maintaining block attribute parity for a stripe.

FIG. 4 is a flow chart illustrating an exemplary method 400 of maintaining block attribute parity within a stripe. In particular, method 400 calculates and stores block attribute parity for a stripe in response to a request to write a data value to a block within the stripe. At block 405, a node 105 receives a request to write a data value to a block within a stripe stored in storage 150 attached to node 105. At block 410, node 105 (e.g., VSAN module 135) optionally determines whether or not the stripe is a part of a snapshot. For example, another storage management algorithm may not create stripes with holes. If the stripe does not or cannot include holes, node 105 may conserve resources and forgo maintenance of block attribute parity.

If the stripe is a part of a snapshot or if block 410 is omitted, at block 415, node 105 determines a block attribute for one or more additional blocks within the stripe. For example, VSAN module 135 may query other VSAN modules 135 for an indication of whether or not the other blocks within the stripe include written data values. In one embodiment, the query is a request to "get written extents" or a similar request. Each VSAN module 135 maintains an address map or other data structure indicating which blocks within their respective storage 150 include written data. In response to such a query, the other VSAN module(s) 135 look up the block(s) within the map/data structure to determine if the block(s) include written data and return, to the VSAN module 135 that sent the query, an indication of whether or not the block(s) include written data.

At block 420, node 105 calculates block attribute parity. For example, as discussed above with reference to FIG. 3, a value may be assigned as a block attribute for each block within a stripe. One potential block attribute value (e.g., a "0") indicates a hole and another potential value (e.g., a "1") indicates written data. Block attribute parity may be calculated using a parity formula on the block attribute values for the blocks within the stripe. A simple example includes applying an XOR to the block attribute values to calculate the block attribute parity. At block 425, node 105 writes the calculated block attribute parity to storage 105.

If the stripe is not a part of a snapshot, or in addition to calculating block attribute parity, node 105 calculates data parity value at block 430. As a simple example, node 105 applies an XOR to all data values to calculate the data parity. At block 435, node 105 writes the data value from the write request and the calculated data parity value to storage 105.

In one embodiment, the block attribute parity value, data value, and data parity value are not committed to storage 105 unless all three were successfully written. For example, at block 440, node 105 optionally determines if the block attribute parity value, data value, and data parity value were successfully written. If so, at block 445, node 105 commits the data value, data value parity, and block attribute parity to storage 105 and returns an indication of a successful write. If one of the writes was unsuccessful, at block 450, node 105 aborts the write request and returns an indication of an unsuccessful write.

Figure 5:
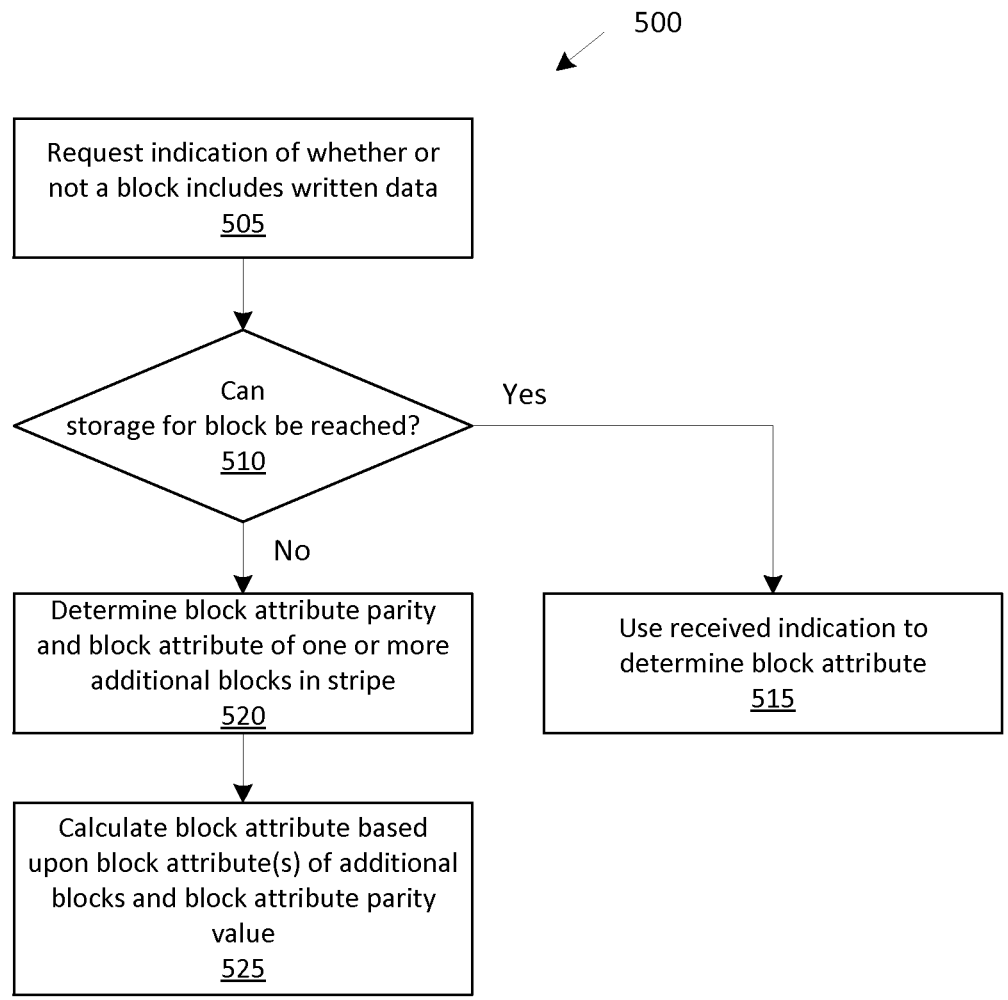
FIG. 5 is a flow chart illustrating an exemplary method of determining if a block includes written data.

FIG. 5 is a flow chart illustrating an exemplary method 500 of determining if a block includes written data. At block 505, node 105 requests an indication of whether or not a block includes written data. For example, the VSAN module 135 of node 105 may transmit a request to another VSAN module 135 that locally manages storage for the block. The request may be a request for written extents or another indication of whether or not the block includes written data. Alternatively, if the block is managed by the local VSAN module, the VSAN module determines written extents.

At block 510, node 105 (e.g., VSAN module 135) determines if the storage for the block can be reached. For example, if a response to the request is not received within a threshold period time, node 105 determines the storage for the block cannot be reached. In one embodiment, node 105 uses another mechanism (e.g., a heartbeat, notification from management platform 130, etc.) to determine that the storage for the block cannot be reached. Alternatively, node 105 determines the storage for the block can be reached if, e.g., a response to the request is received.

If the storage for the block can be reached, at block 515, node 105 uses a received indication of whether or not the block includes written data to determine the block attribute. Following the example of FIG. 3, if the other VSAN module 135 returns an indication that the block includes written data, node 105 determines the block has a block attribute of "1" and if the other VSAN module 135 returns an indication that the block does not include written data, node 105 determines the block has a block attribute of "0."

If the storage for the block cannot be reached, at block 520, node 105 determines the block attribute parity for the stripe and the block attribute of each of one or more additional blocks within the stripe. For example, the VSAN module 135 of node 105 may transmit a request to each VSAN module 135 that locally manages storage for the blocks within the stripe as well as the block attribute parity for the stripe. In response, the VSAN module 135 receives indications of whether or not each block includes written data (as a block attribute or another indication) and the value of the block attribute parity. Additionally, VSAN module may determine the block attribute of a block stored within locally attached storage 150 by determining whether the block is among those written.

At block 525, node 105 calculates the block attribute for the block within the storage that could not be reached based upon the block attribute(s) of the other blocks and the block attribute parity value. Continuing the examples above, node 105 may apply an XOR to the values of the block attribute(s) and block attribute parity value to calculate the block attribute for the missing block.

Figure 6:
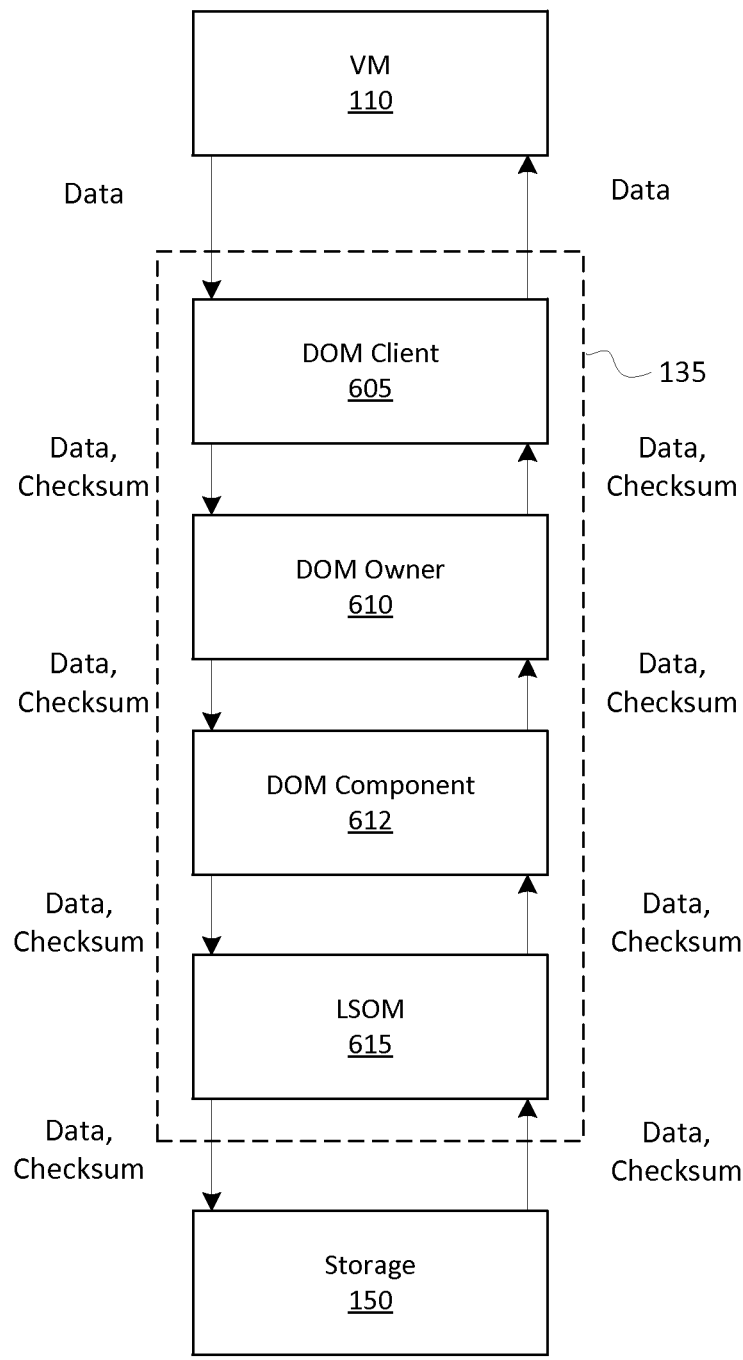
FIG. 6 illustrates, in block diagram form, a virtual storage area network software stack to implement checksum calculation and verification.

Providing End-To-End Checksum Within a Distributed Virtual Storage Area Network Module FIG. 6 illustrates, in block diagram form, the software stack within VSAN module 135 to implement checksum calculation and verification. VSAN module 135 includes distributed object manager (DOM) client layer 605, DOM Owner layer 610, DOM Component layer 612, and local log structured object manager (LSOM) layer 615. DOM client 605 provides an interface for VMs 110 to access VSAN 115. For example, a VM 110 may transmit data along with a request to DOM client 605 to write the data to VSAN 115 (e.g., as implemented using storage 150). Additionally, VM 110 may utilize DOM client 605 to read data from VSAN 115.

DOM client 605 passes I/O requests to the DOM owner 610 for the storage object corresponding to the I/O request. For example, DOM client 605 traverses a database, map, or other data structure to determine a DOM owner 610 for the storage object. Given that VSAN module 135 in each node 105 implements a distributed architecture across nodes 105, one layer of VSAN 135 module within one node 105 may interact with another layer of VSAN module 135 within another node 105. In one embodiment, VMs 110 interface with a DOM client 605 within the same node 105 upon which the VMs 110 run. The DOM owner 610 may also run on the same node 105 as the DOM client 605 that is handling the I/O request on behalf of VM 110. In one embodiment, however, the DOM client 605 passes an I/O request to a DOM owner 610 running on a different node 105.

DOM owner 610 controls access to/manages objects, maintains distributed locations of objects for directing I/O within VSAN 115, and communicates w/other VSAN modules 135. For example, DOM owner 610 traverses a hierarchy of objects using the metadata in the in-memory database in order to properly route an I/O operation request to the node (or nodes) 105 that houses (house) storage 150.

DOM owner layer 610 and DOM component layer 612 handle, respectively, object level management and component level management. As described above, objects may be comprised of a plurality of components (e.g., blocks within a stripe). DOM owner layer 610 passes the I/O operation to LSOM 615 via DOM component layer 612. LSOM 615 provides local management of storage 150, implementing the actual I/O for storage 150 (e.g., to read components from and write components to local storage 150).

Figure 7:
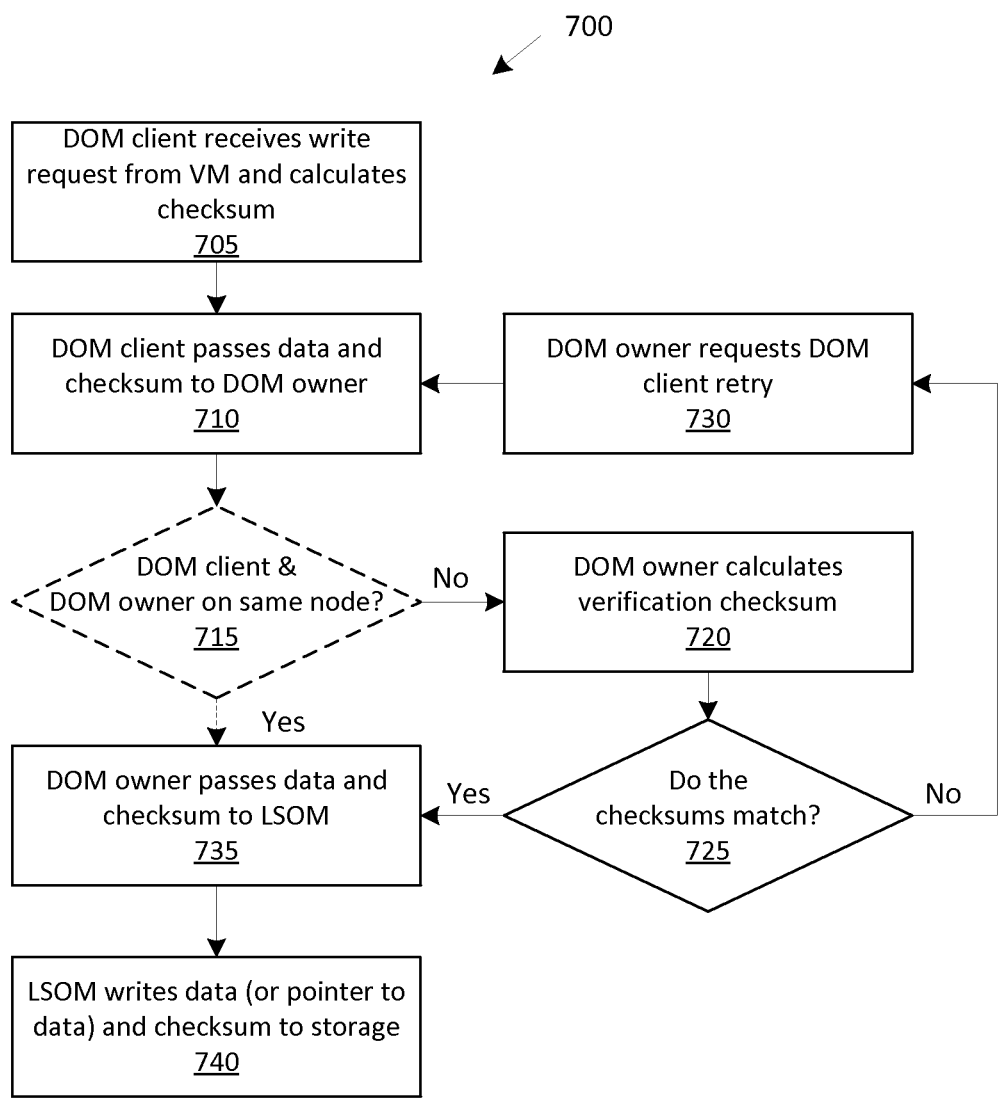
FIG. 7 is a flow chart illustrating an exemplary method of a virtual storage area network software stack processing a write request.
Figure 8:
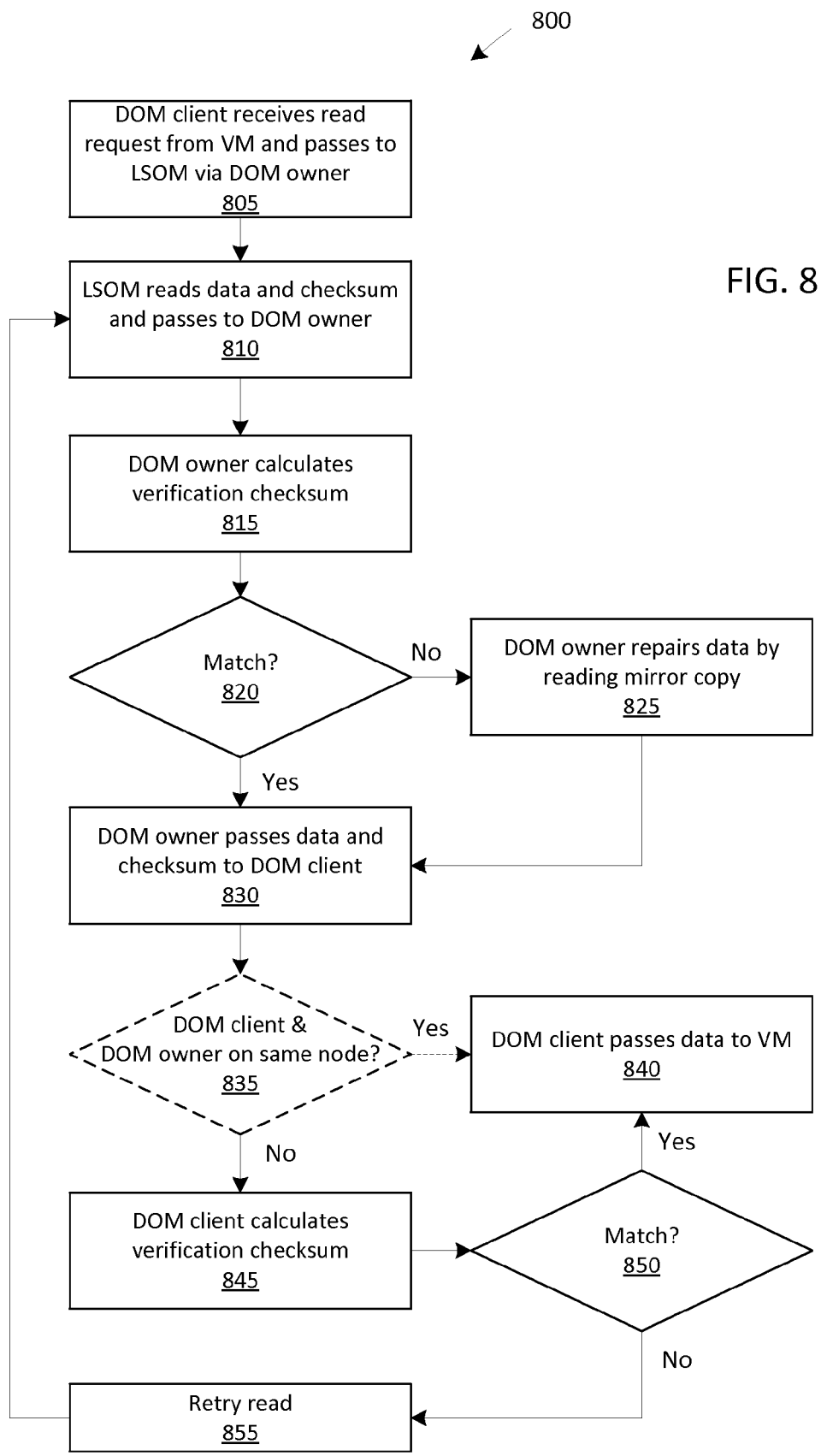
FIG. 8 is a flow chart illustrating an exemplary method of a virtual storage area network software stack processing a read request.

As described further with reference to FIGS. 7 and 8, the software stack within VSAN module 135 provides end-to-end checksum verification of data. For example, in response to data being passed from VM 110 to DOM client 605 as part of a write request, DOM client 605 calculates a checksum for the data. The checksum and data are passed together from layer to layer to enable a DOM owner 610 and/or LSOM 615 to verify (e.g., via calculation of a verification checksum compared with the passed checksum) that the data was not corrupted. The data and checksum are stored, in a cache and/or persistent storage, such that the checksum is read along with the data and may be used for verification as the data passes back up the stack from LSOM 615 to DOM owner 610 and DOM client 605. Data, once read and verified by one or more layers within VSAN module 135 via calculating a verification checksum and comparing checksums, is passed to the requesting VM 110.

FIG. 7 is a flow chart illustrating exemplary method 700 of VSAN module(s) 135 processing a write request. At block 705, a DOM client receives a write request from a VM. The write request includes data to be written to object store 116. The DOM client calculates one or more checksums for the data. For example, the DOM client applies a hash function or other checksum algorithm to each block of the data to generate one or more checksums. For simplicity in describing method 700, the following will reference a single checksum.

At block 710, the DOM client passes the data and checksum to a DOM owner. If the DOM client and DOM owner reside within the same node, the data and checksum are passed by reference to shared memory. If the DOM client and DOM owner reside within different nodes, the data and checksum are transmitted via a network connection.

At block 715, the DOM owner optionally determines if the DOM client and DOM owner reside within the same node. In one embodiment, the DOM owner receives an identification of the DOM client or DOM client node during the passing of the data and checksum and determines, based upon the identification, whether or not the DOM client and DOM owner reside within the same node. For example, the DOM owner may compare a received node identification to an identification of its own node, map an identifier to a node using a stored table or other data structure, etc.

If the DOM client and DOM owner do not reside within the same node, at block 720, the DOM owner calculates a verification checksum. For example, the DOM owner applies the hash function or other checksum algorithm to the received block of data in a similar manner to the DOM client as described above. In an alternate embodiment, method 700 omits the determination whether or not the DOM client and DOM owner reside within the same node of block 715 and proceeds directly block 720.

At block 725, the DOM owner compares the verification checksum and received checksum to determine if the verification checksum matches the received checksum. If the checksums do not match, at block 730, the DOM owner passes a request to the DOM client to retry sending the data and checksum and method 700 returns to block 710. As a result, the DOM owner is able to detect if the data is corrupted when passed between nodes and request a retry to ensure the correct data is written.

If the checksums match or if the DOM client and DOM owner reside on the same node, at block 735, the DOM owner passes the received data and checksum to the LSOM layer. In one embodiment, the DOM component layer verifies the checksum in a similar manner to the DOM owner, e.g., as described with reference to blocks 715-730, to determine if the DOM owner and DOM component reside within the same node, if the checksums match, etc. Additionally or alternatively, the LSOM layer may verify the checksum, e.g., as described with reference to blocks 715-730.

At block 740, the LSOM layer writes the data to the object store. For example, LSOM writes the data, or a pointer to the data, and the checksum to a cache, e.g., on a solid state drive 117. In one embodiment, LSOM creates a logical log entry with the checksum. A logical log entry is an ordered persistent log that maps the checksum to a logical offset for the data. In one embodiment, a batch writing algorithm writes the logical log entry to a physical log entry (e.g., using the physical address for the data) and writes the checksum to an in-memory write back cache. In one embodiment, a read cache is configured to maintain a reservation for checksums such that checksums can be written to and are not evicted from the read cache. In one embodiment, the checksum is committed and/or flushed from the write back cache to a persistent store, e.g., on a magnetic disk 118. In one embodiment, the checksum is passed and/or stored along with or as a part of the block attribute described above.

FIG. 8 is a flow chart illustrating exemplary method 800 of a VSAN module(s) 135 processing a read request. At 805, a DOM client receives a read request from a VM and passes the request to the LSOM layer via the DOM owner. For example, the VM may generate a read request with reference to a logical address or offset. The VM passes the read request to the DOM client. The request and address/offset are passed to the DOM owner. The DOM owner uses an in-memory database to route the request to the LSOM layer on the node that houses the local storage that backs the portion of the virtual disk that is subject to the I/O operation.

At block 810, the LSOM layer reads the data and corresponding checksum and passes the data and checksum to the DOM owner. For example, the LSOM layer may determine if the data is stored in a cache (e.g., logical log, physical log, or in-memory cache). If stored in a cache, the LSOM layer reads the checksum and data from the SSD. If not, the LSOM layer reads the data from the magnetic disk and the checksum from the in-memory write back cache or as stored in the SSD (e.g., the checksum may be stored in the reserved area of the read cache despite the data being flushed to the magnetic disk).

In one embodiment, if the DOM owner and LSOM reside within the same node, the data and checksum are passed by reference to shared memory. If the DOM owner and LSOM reside within different nodes, the data and checksum are transmitted via a network connection.

At block 815, the DOM owner calculates a verification checksum. For example, the DOM owner applies the hash function or other checksum algorithm to the read block of data in a similar manner to the write operation described above.

At block 820, the DOM owner compares the verification checksum and read checksum to determine if the verification checksum matches the read checksum. If the checksums do not match, at block 825, the DOM owner repairs the data by reading a mirror copy of the data from another data store.

If the checksums match or after repairing the data, at block 830, the DOM owner passes the data and checksum to the DOM client that handled the read request. Similar to the description above, the data and checksum may be passed via shared memory or a network connection depending upon whether or not the DOM owner and DOM client reside within the same node.

At block 835, the DOM client optionally determines if the DOM client and DOM owner reside within the same node. Similar to the description above, the DOM client may make this determination based upon how the data and checksum were passed or based upon identifiers of the layers and/or node(s).

If the DOM client and DOM owner reside within the same node, at block 840, the DOM client passes the data to the VM that originated the read request. If the DOM client and DOM owner do not reside within the same node, at block 845, the DOM client calculates a verification checksum. For example, the DOM client applies the hash function or other checksum algorithm to the block of data in a similar manner described above. In an alternate embodiment, method 800 omits the determination whether or not the DOM client and DOM owner reside within the same node of block 835 and proceeds directly block 845.

At block 850, the DOM client compares the verification checksum and received checksum to determine if the verification checksum matches the received checksum. If the checksums match, at block 840, the DOM client passes the data to the VM that originated the read request. If the checksums do not match, at block 855, the DOM client passes the read request to the DOM owner again to retry reading the data and checksum and method 800 returns to block 810. As a result, the DOM client is to benefit from the distributed architecture of the VSAN modules and still be able to ensure the correct data is read and delivered to the VM.

Figure 9:
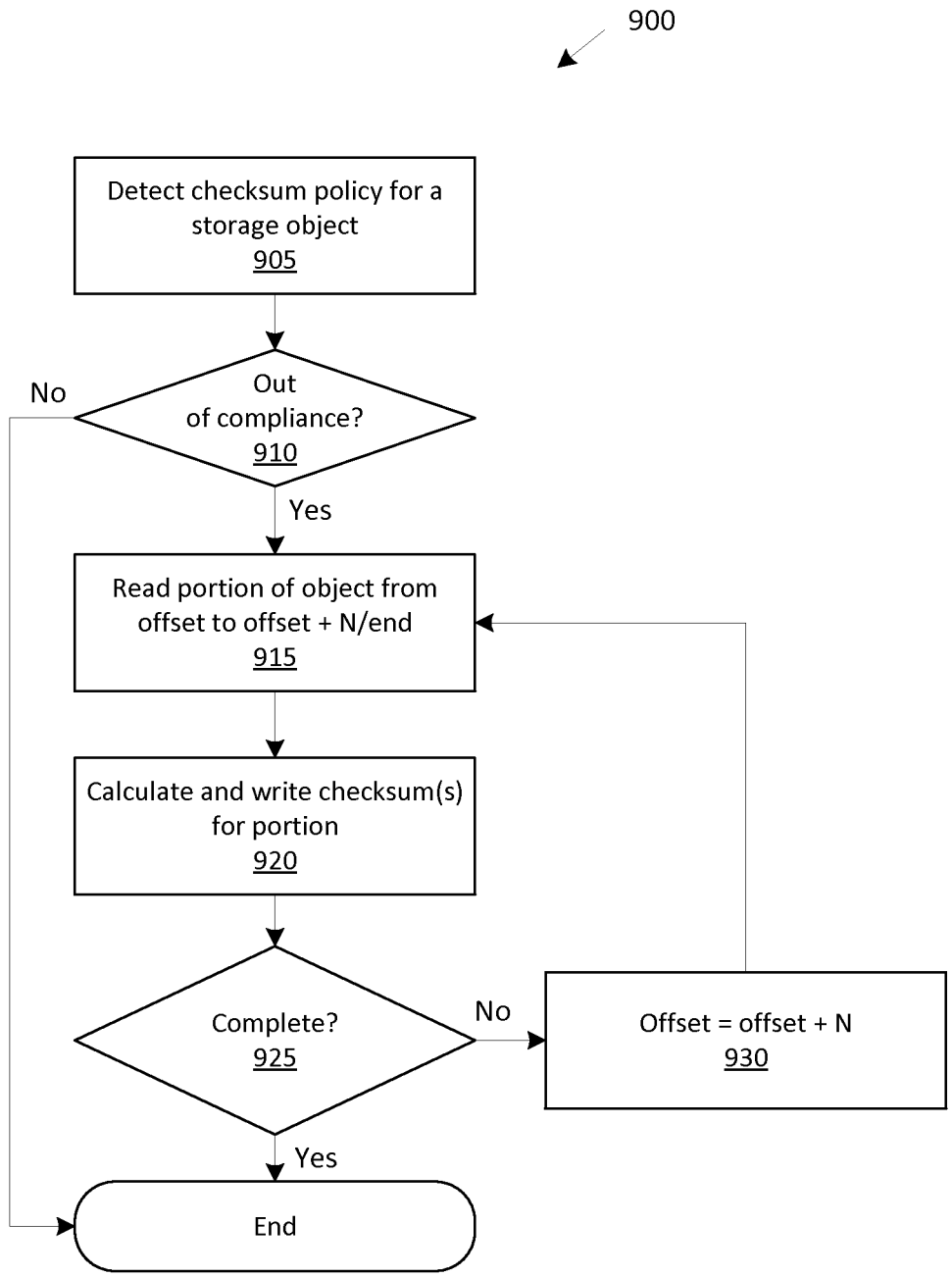
FIG. 9 is a flow chart illustrating an exemplary method of applying a checksum policy to a storage object.

FIG. 9 is a flow chart illustrating exemplary method 900 of applying a checksum policy to a storage object. At block 905, the VSAN module detects a checksum policy for a storage object. For example, an administrator may utilize management platform 130 to set an option for a virtual disk to utilize checksums. A change in this policy would be passed from management platform 130 to VSAN module 135 and detected by, e.g., by the DOM owner 610 for the virtual disk.

At block 910, the VSAN module determines if the storage object is out of compliance with the policy. For example, the VSAN module may store a flag or other indication if a storage object was written or otherwise changed while a checksum policy was turned off. If no changes have occurred and the VSAN module has already calculated and stored checksums for the storage object, method 900 ends.

If the storage object has changed or the VSAN module has not calculated and stored checksums for the storage object, at block 915, the VSAN module reads a portion of the storage object. The portion is read from a range starting at an offset value and continuing up to the offset+N (or to the end of the storage object if offset+N is greater than the offset of the end of the storage object). For example, the offset may be initially set to a value of zero within the storage object or an equivalent to the beginning offset value within the storage object. Alternatively, the offset may be initially set to an offset value at which checksums have not been calculated or updated.

At block 920, the VSAN module calculates and stores one or more checksums for the portion of the storage object. As described above, a portion of a cache may be reserved for checksums.

At block 925, the VSAN module determines if the end of the storage object has been reached. If not, at block 930, the VSAN module updates the offset value to offset value to offset+N (persistently) and method 900 returns to block 915 to continue reading portions of the storage object, calculating checksums, and writing the calculated checksums to storage. When the end of the storage object has been reached, method 900 ends.

Maintaining Encryption Keys to Provide Encryption on Top of Data Deduplication

Figure 10:
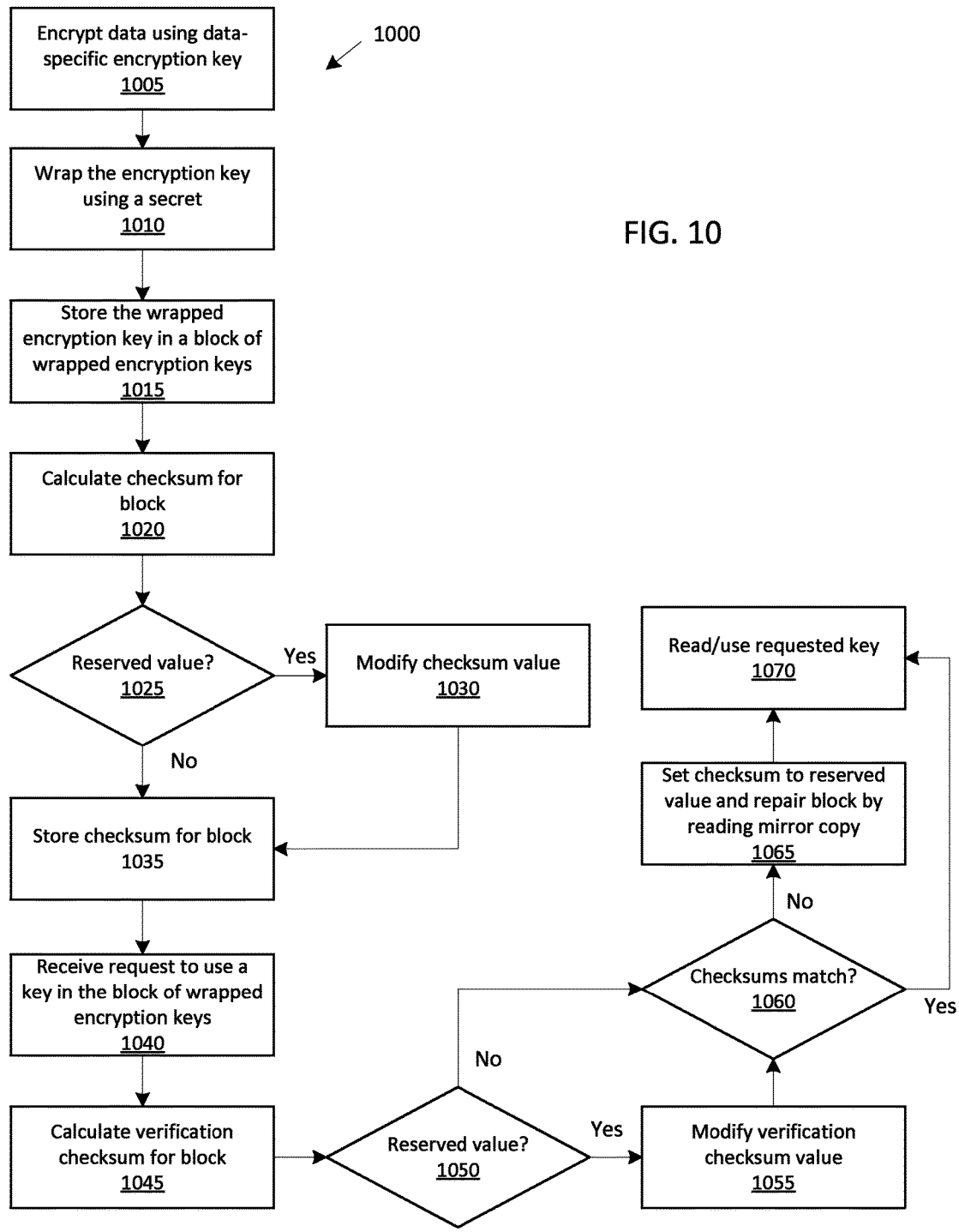
FIG. 10 is a flow chart illustrating an exemplary method of storing and verifying encryption keys that enable deduplication of encrypted data.

FIG. 10 is a flow chart illustrating exemplary method 1000 of storing and verifying encryption keys that enable deduplication of encrypted data. At block 1005, the VSAN module encrypts data using a data specific encryption key. For example, the VSAN module encrypts a block of data using a convergent encryption key. A convergent encryption key utilizes an algorithm, such as a hash algorithm, to generate an encryption key using the data of the block and a secret key: encryption key=hash(data text, secret key). In one embodiment, the secret key is shared across a tenant of a datacenter or other disk grouping. As a result, matching data text will be encrypted into matching cipher text and the data may be deduplicated across the tenant/disk group after being encrypted.

At block 1010, the VSAN module wraps the encryption key using a secret. For example, a key wrap algorithm encrypts or otherwise encapsulates the encryption key for secure storage and/or transmission of the encryption key. In one embodiment, the key wrap secret is shared across a tenant of a datacenter or other disk grouping. Using a per-tenant secret(s) provides a balance between security and space saving. For example, a per-tenant secret provides isolation between tenants to satisfy security policies while still enabling data deduplication within the tenant to save space. In one embodiment, the secret is shared across multiple tenants to maximize space efficiency. In another embodiment, the secret is shared across another set of users—e.g., shared by a single department of users within a tenant but not by another department to increase security within the tenant.

At block 1015, the VSAN module stores the wrapped encryption key in a block of wrapped encryption keys. In one embodiment, a combination of one or more of a block attribute, block attribute parity value, checksum values for data, and/or wrapped encryption keys are stored in each block. For example, one block of data may result in 1 byte for block attribute/block attribute parity data, 4 bytes of checksum data, and 16 bytes for a wrapped encryption key, resulting in a 21 byte combination. Approximately 195 of these 21 byte combinations may be stored in a 4K block.

At block 1020, the VSAN module calculates a checksum for the block of wrapped encryption keys. For example, the VSAN module applies a hash function or other checksum algorithm to the block of the encryption keys to generate a checksum for verifying the integrity of the encryption keys (as well as, in one embodiment, the block attribute, block attribute parity value, and/or data checksum value).

At block 1025, the VSAN module determines if the calculated checksum value is equal to a reserved value. In one embodiment, one checksum value is reserved as an indication of a corrupt block. This indication of a corrupt block can be saved as a persistent checksum value to enable repair of the block even in the event of a crash or other failure to complete the repair.

If the calculated checksum value is equal to a reserved value, at block 1030, the VSAN module modifies the checksum value. In one embodiment, the modification includes applying a mathematical operation of a constant to the checksum. For example, a "1" may be added to or subtracted from the checksum value to modify the calculated result to no longer equal the reserved value. Alternatively, the checksum value is modified to a preselected alternate value, a bit within the checksum value is flipped, or another manipulation is applied to modify the calculated result to no longer equal the reserved value.

If the calculated checksum value does not equal to a reserved value, or once the checksum value is modified, at block 1035, the checksum for the block of encrypted keys is stored. For example, the VSAN module writes the checksum to a cache, e.g., on a solid state drive 117. In one embodiment, the VSAN module creates a logical log entry with the checksum or writes the checksum to an in-memory write back cache. In one embodiment, a read cache is configured to maintain a reservation for encryption key block checksums such that the checksums can be written to and are not evicted from the read cache. In one embodiment, the checksum is committed and/or flushed from the write back cache to a persistent store, e.g., on a magnetic disk 118.

At block 1040, the VSAN module receives a request to use an encryption key within the block of encryption keys. For example, the VSAN module may receive a read or write request that requires using an encryption key to decrypt a block of data.

At block 1045, the VSAN module calculates a verification checksum for the block of encryption keys. Similar to the previous checksum calculation, at block 1050, the VSAN module determines if the calculated verification checksum value is equal to a reserved value. If the calculated verification checksum value is equal to the reserved value, at block 1055, the VSAN module modifies the verification checksum value in the manner described above.

If the calculated verification checksum value does not equal to a reserved value, or once the verification checksum value is modified, at block 1060, the VSAN module compares the stored checksum and the verification checksum to determine if the encryption key block has been corrupted.

If the checksums do not match, at block 1065, the VSAN module sets the stored checksum to the reserved value. The reserved checksum value serves as a persistent indication of a corrupt block. The VSAN repairs the encryption key block, e.g., by reading a minor copy of the block from another data store. Should power be lost or another event occur during repair of the encryption key block, the saved checksum set to the reserved value will continue to indicate the need for repair. Once repaired, the VSAN module recalculates and stores a checksum for the block, e.g., as described with reference to blocks 1020-1035.

If the checksums match or after repairing the block, at block 1070, the VSAN module unwraps the requested encryption key and, e.g., uses it to decrypt the corresponding block of data.

It will be apparent from this description that aspects of the inventions may be embodied, at least in part, in software. That is, the computer-implemented method(s) 400, 500, 700, 800, 900, and 1000 may be carried out in a computer system or other data processing system, such as nodes 105, in response to its processor executing sequences of instructions contained in a memory or other non-transitory machine-readable storage medium. The software may further be transmitted or received over a network (not shown) via a network interface. In various embodiments, hardwired circuitry may be used in combination with the software instructions to implement the present embodiments. Thus, the techniques are not limited to any specific combination of hardware circuitry and software, or to any particular source for the instructions executed by a node 105. It will also be appreciated that additional components, not shown, may also be part of nodes 105, and, in certain embodiments, fewer components than that shown in FIG. 1 may also be used in nodes 105.

An article of manufacture may be used to store program code providing at least some of the functionality of the embodiments described above. Additionally, an article of manufacture may be used to store program code created using at least some of the functionality of the embodiments described above. An article of manufacture that stores program code may be embodied as, but is not limited to, one or more memories (e.g., one or more flash memories, random access memories—static, dynamic, or other), optical disks, CD-ROMs, DVD-ROMs, EPROMs, EEPROMs, magnetic or optical cards, solid state drives (SSD), or other type of non-transitory machine-readable media suitable for storing electronic instructions. Additionally, embodiments of the invention may be implemented in, but not limited to, hardware or firmware utilizing an FPGA, ASIC, a processor, a computer, or a computer system including a network. Modules and components of hardware or software implementations can be divided or combined without significantly altering embodiments of the invention.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses distinct name spaces to isolate the containers from each other and therefore provides operating-system level segregation of the different groups of applications that operate within different containers. This segregation is akin to the VM segregation that is offered in hypervisor-virtualized environments, and thus can be viewed as a form of virtualization that isolates different groups of applications that operate in different containers. Such containers are more lightweight than VMs.

It should be recognized that while the specification refers to VMs, the examples given could be any type of DCNs, including physical hosts, VMs, non-VM containers, and hypervisor kernel network interface modules. In fact, the example networks could include combinations of different types of DCNs in some embodiments.

In the foregoing specification, the invention(s) have been described with reference to specific exemplary embodiments thereof. Various embodiments and aspects of the invention(s) are described with reference to details discussed in this document, and the accompanying drawings illustrate the various embodiments. The description above and drawings are illustrative of the invention and are not to be construed as limiting the invention. References in the specification to "one embodiment," "an embodiment," "an exemplary embodiment," etc., indicate that the embodiment described may include a particular feature, structure, or characteristic, but not every embodiment may necessarily include the particular feature, structure, or characteristic. Moreover, such phrases are not necessarily referring to the same embodiment. Furthermore, when a particular feature, structure, or characteristic is described in connection with an embodiment, such feature, structure, or characteristic may be implemented in connection with other embodiments whether or not explicitly described. Additionally, as used in this document, the term "exemplary" refers to embodiments that serve as simply an example or illustration. The use of exemplary should not be construed as an indication of preferred examples. Blocks with dashed borders (e.g., large dashes, small dashes, dot-dash, dots) are used to illustrate virtualized resources or, in flow charts, optional operations that add additional features to embodiments of the invention. However, such notation should not be taken to mean that these are the only options or optional operations, and/or that blocks with solid borders are not optional in certain embodiments of the invention. Numerous specific details are described to provide a thorough understanding of various embodiments of the present invention. However, in certain instances, well-known or conventional details are not described in order to provide a concise discussion of embodiments of the present inventions.

It will be evident that various modifications may be made thereto without departing from the broader spirit and scope of the invention as set forth in the following claims. For example, the methods described in this document may be performed with fewer or more features/blocks or the features/blocks may be performed in differing orders. Additionally, the methods described in this document may be repeated or performed in parallel with one another or in parallel with different instances of the same or similar methods.

What is claimed is:

1. A computer-implemented method, comprising:
receiving, by a first layer of a virtual storage area network (VSAN) module, a write request from a data compute node, wherein the write request includes data to be written and wherein the VSAN module is distributed across a plurality of computers to provide an aggregate object store using storage attached to each of the plurality of computers;
calculating, by the first layer of the VSAN module, a checksum for the data to be written;
passing, by the first layer of the VSAN module to a second layer of the VSAN module, the data to be written and the checksum, the second layer of the VSAN module running within a first computer of the plurality of computers;
determining, by the second layer of the VSAN module, that the first layer passed the checksum from a computer other than the first computer;
calculating, by the second layer of the VSAN module, a first verification checksum for the data to be written in response to determining that the first layer passed the checksum from the computer other than the first computer;
determining, by the second layer of the VSAN module, that the first verification checksum matches the checksum passed by the first layer of the VSAN module;
writing the data and the checksum to persistent storage in response to determining the first verification checksum matches the checksum passed by the first layer of the VSAN module;
passing, by the first layer of the VSAN module, additional data and a checksum corresponding to the additional data via shared memory; and writing the additional data and corresponding checksum to the persistent storage without calculating a second verification checksum for the additional data in response to determining that the corresponding checksum was passed within the first computer.

2. The computer-implemented method of claim 1, further comprising:
configuring a 100% read cache reservation in a persistent read cache to guarantee space for checksums for blocks stored in the persistent read cache.

3. The computer-implemented method of claim 1, further comprising:
receiving, by the second layer of the VSAN module, the data and the checksum in response to a request to read the data;
calculating, by the second layer of the VSAN module, a second verification checksum for the received data; and
passing, by the second layer of the VSAN module to the first layer of the VSAN module, the received data and the checksum in response to determining the second verification checksum matches the received checksum.

4. The computer-implemented method of claim 1, further comprising:
receiving, by the first layer of the VSAN module from the second layer of the VSAN module, the data and the checksum in response to a request to read the data;
calculating, by the first layer of the VSAN module, a second verification checksum for the data in response to determining the data and the checksum were received from another computer; and
passing, by the first layer of the VSAN module to the data compute node, the received data and the checksum in response to determining the second verification checksum matches the received checksum.

5. The computer-implemented method of claim 1, further comprising:
receiving an indication of a policy to use checksums for a storage object;
determining that the storage object is out of compliance with the policy to use checksums; and
iteratively reading each portion of the storage object and calculating and writing a checksum for each portion until the storage object is in compliance with the policy to use checksums.

6. A non-transitory computer-readable medium storing instructions, which when executed by a processing device, cause the processing device to perform a method comprising:
receiving, by a first layer of a virtual storage area network (VSAN) module, a write request from a data compute node, wherein the write request includes data to be written and wherein the VSAN module is distributed across a plurality of computers to provide an aggregate object store using storage attached to each of the plurality of computers;
calculating, by the first layer of the VSAN module, a checksum for the data to be written;
passing, by the first layer of the VSAN module to a second layer of the VSAN module, the data to be written and the checksum, the second layer of the VSAN module running within a first computer of the plurality of computers;
determining, by the second layer of the VSAN module, that the first layer passed the checksum from a computer other than the first computer;
calculating, by the second layer of the VSAN module, a first verification checksum for the data to be written in response to determining that the first layer passed the checksum from the computer other than the first computer;
determining, by the second layer of the VSAN module, that the first verification checksum matches the checksum passed by the first layer of the VSAN module;
writing the data and the checksum to persistent storage in response to determining the first verification checksum matches the checksum passed by the first layer of the VSAN module;
passing, by the first layer of the VSAN module, additional data and a checksum corresponding to the additional data via shared memory; and
writing the additional data and corresponding checksum to the persistent storage without calculating a second verification checksum for the additional data in response to determining that the corresponding checksum was passed within the first computer.

7. The non-transitory computer-readable medium of claim 6, the method further comprising:
configuring a 100% read cache reservation in a persistent read cache to guarantee space for checksums for blocks stored in the persistent read cache.

8. The non-transitory computer-readable medium of claim 6, the method further comprising:
receiving, by the second layer of the VSAN module, the data and the checksum in response to a request to read the data;
calculating, by the second layer of the VSAN module, a second verification checksum for the received data; and
passing, by the second layer of the VSAN module to the first layer of the VSAN module, the received data and the checksum in response to determining the second verification checksum matches the received checksum.

9. The non-transitory computer-readable medium of claim 6, the method further comprising:
receiving, by the first layer of the VSAN module from the second layer of the VSAN module, the data and the checksum in response to a request to read the data;
calculating, by the first layer of the VSAN module, a second verification checksum for the data in response to determining the data and the checksum were received from another computer; and
passing, by the first layer of the VSAN module to the data compute node, the received data and the checksum in response to determining the second verification checksum matches the received checksum.

10. The non-transitory computer-readable medium of claim 6, the method further comprising:
receiving an indication of a policy to use checksums for a storage object;
determining that the storage object is out of compliance with the policy to use checksums; and
iteratively reading each portion of the storage object and calculating and writing a checksum for each portion until the storage object is in compliance with the policy to use checksums.

11. An apparatus comprising:
a processing device; and
a memory coupled to the processing device, the memory storing instructions which, when executed by the processing device, cause the apparatus to:
receive, by a first layer of a virtual storage area network (VSAN) module, a write request from a data compute node, wherein the write request includes data to be written and wherein the VSAN module is distributed across a plurality of computers to provide an aggregate object store using storage attached to each of the plurality of computers;

calculate, by the first layer of the VSAN module, a checksum for the data to be written;

pass, by the first layer of the VSAN module to a second layer of the VSAN module, the data to be written and the checksum, the second layer of the VSAN module running within a first computer of the plurality of computers;

determine, by the second layer of the VSAN module, that the first layer passed the checksum from a computer other than the first computer;

calculate, by the second layer of the VSAN module, a first verification checksum for the data to be written in response to determining that the first layer passed the checksum from the computer other than the first computer;

determine, by the second layer of the VSAN module, that the first verification checksum matches the checksum passed by the first layer of the VSAN module;

write the data and the checksum to persistent storage in response to determining the first verification checksum matches the checksum passed by the first layer of the VSAN module;

pass, by the first layer of the VSAN module, additional data and a checksum corresponding to the additional data via shared memory; and write the additional data and corresponding checksum to the persistent storage without calculating a second verification checksum for the additional data in response to determining that the corresponding checksum was passed within the first computer.

12. The apparatus of claim 11, wherein the instructions further cause the host computer to:
configure a 100% read cache reservation in a persistent read cache to guarantee space for checksums for blocks stored in the persistent read cache.

13. The apparatus of claim 11, wherein the instructions further cause the host computer to:
receive, by the second layer of the VSAN module, the data and the checksum in response to a request to read the data;
calculate, by the second layer of the VSAN module, a second verification checksum for the received data; and
pass, by the second layer of the VSAN module to the first layer of the VSAN module, the received data and the checksum in response to determining the second verification checksum matches the received checksum.

14. The apparatus of claim 11, wherein the instructions further cause the host computer to:
receive, by the first layer of the VSAN module from the second layer of the VSAN module, the data and the checksum in response to a request to read the data;
calculate, by the first layer of the VSAN module, a second verification checksum for the data in response to determining the data and the checksum were received from another computer; and
pass, by the first layer of the VSAN module to the data compute node, the received data and the checksum in response to determining the second verification checksum matches the received checksum.

* * * * *